April 18, 1950
L. A. BRAATZ
2,504,385
ROD AND REEL HOLDER
Filed March 31, 1949
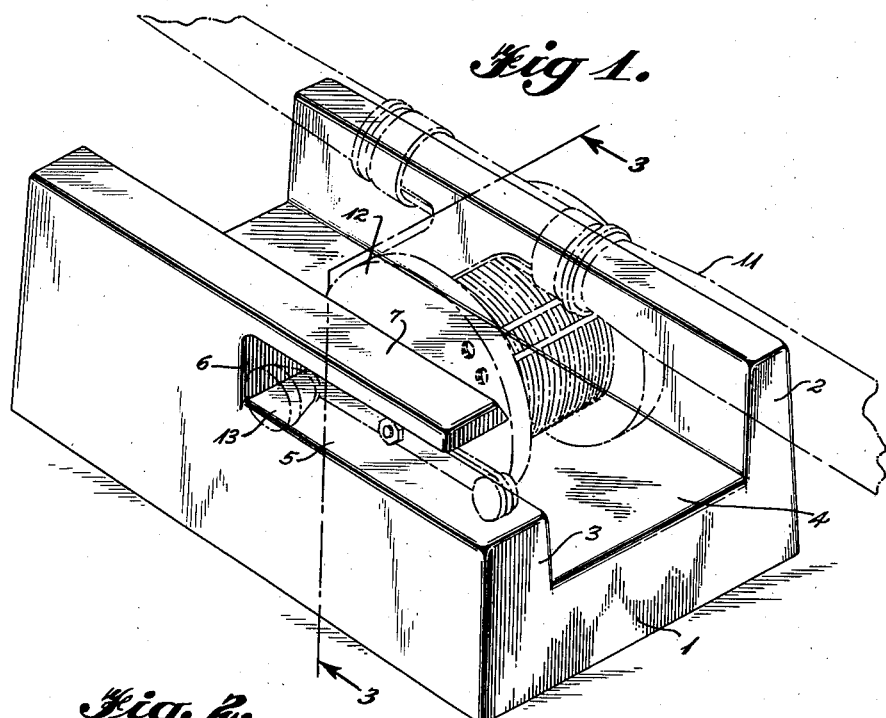
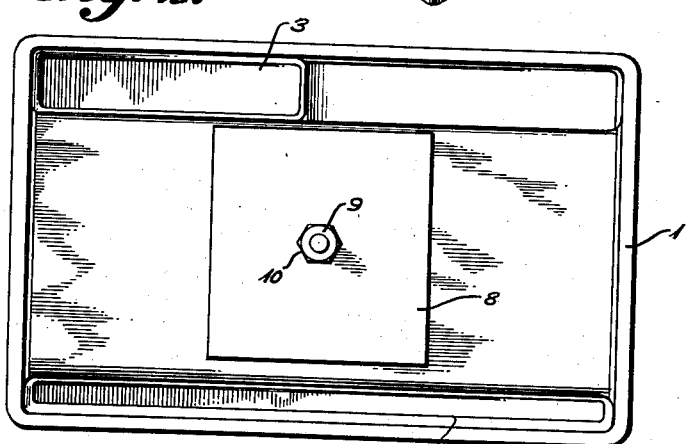
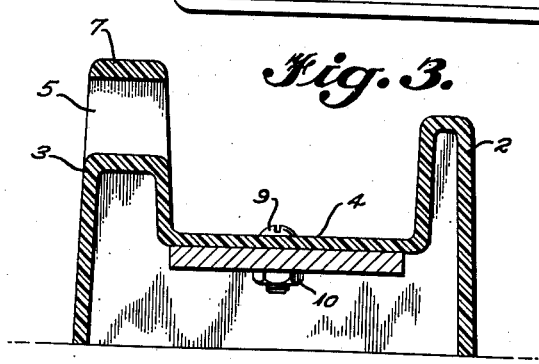
INVENTOR.
Leo A. Braatz
BY
Burns Doane & Benedict
ATTORNEY Patented Apr. 18, 1950

2,504,385

UNITED STATES PATENT OFFICE 2,504,385

ROD AND REEL HOLDER

Leo A. Braatz, Schofield, Wis.

Application March 31, 1949, Serial No. 84,649

2 Claims. (Cl. 43—21.2)

The present invention relates to a novel rod and reel holder for use by fishermen, and more particularly to a rod and reel holder especially adapted for use in rowboats and the like.

When trolling with a rowboat, means must be provided for holding the rod and reel to permit freedom of action on the part of the fisherman in rowing and maneuvering the boat.

This problem, of course, has been appreciated in the past and various forms of rod and reel holders have heretofore been provided. However, for the most part they have to be clamped on some part of the boat and require manipulation of one kind or another in their use.

It is the purpose and object of the present invention to provide a rod and reel holder of great simplicity which is at all times separated from the boat and which may be positioned in the boat in any location desired by the fisherman, for example, the rod and reel holder of the present invention may be positioned on the seat alongside the fisherman or it may be placed on the floor of the boat either in the bow or the stern according to the whims and desires of the particular angler.

The improved rod and reel holder of the present invention will be described in reference to the accompanying drawings wherein:

Fig. 1 is a perspective view illustrating the manner and use of the invention,

Fig. 2 is a bottom plan view of the rod and reel holder, and

Fig. 3 is a cross sectional view on the line 3—3 of Figure 1 showing the rod and reel holder in the absence of a rod and reel.

Referring to Figure 1, the rod and reel holder is provided with an elongated base frame structure 1. A first wall 2, coextensive with the base frame 1, projects upwardly from one side of the base frame 1 and a second wall 3 projects upwardly from the opposite side of the base frame 1, thus providing between the walls 2 and 3 an elongated channel having a flat bottom 4.

In the form of the invention shown, the wall 2 is somewhat lower than the wall 3 for a purpose to be presently described. The wall 3 is somewhat thicker than wall 2 and is provided with a slot 5 extending from one end of the wall 3 to the point 6 intermediate the length of the base frame 1 and about midway thereof to provide the elongated projecting portion 7 above the slot 5.

In the form of the invention shown the rod and reel holder is fabricated from molded plastic. The base frame 1 is, therefore, rectangular in configuration as can be seen by reference to Figure 2. The marginal walls of the base frame 1, thus define a hollow structure. In order to insure the requisite weight for the rod and reel holder, there is provided a separable weight 8 adapted to be clamped against the lower side of the channel floor 4 by the screw 9 and nut 10.

Describing now the manner of use of the rod and reel holder of the invention, it will be observed that the wall 2 constitutes what might be termed the right hand wall of the rod and reel holder, whereas the slotted wall 3 constitutes the left hand wall of the rod and reel holder. The rod is diagrammatically shown at 11, in Figure 1. The reel 12 in the position shown in Figure 1 is disposed below the rod 11 with the handle 13 thereof positioned in the slot 5 of the wall 3 where it is held against rotation, thus locking the reel and preventing the paying out of further line.

In fishing, the angler usually casts with his right hand with the reel above the rod. By simply turning his hand to the left to bring the reel to a position below the rod, he can slide the reel 12 into the channel between the walls 2 and 3 with the handle 13 thereof moving through the open end of the slot 5. The dimensions of the channel between the walls 2 and 3 are such that the reel cannot tip out of the channel. The dimensions of the slot 5 are so proportioned as to receive and hold the reel handle and in cooperation with the side walls 2 and 3 to retain the rod and reel in position in the rod and reel holder. It is usually found advantageous to rest the rod beyond the holder on the gunwale of the boat. By providing the wall 2 somewhat lower than the wall 3, the placing of the reel in the channel between the walls 2 and 3 is facilitated since the side of the reel 12 adjacent to handle 13 may be brought into contact with the projection 7 above the slot 5 of the higher wall 3 in initially guiding the reel into the channel.

It will be appreciated that the rod and reel holder of the present invention may be moved at will to any position in the boat since it need not be clamped or otherwise affixed in any one place. The weighting of the rod and reel holder is adequate to insure against unwanted displacement of the same when in use. In as much as the reel is locked against rotation so that no additional line pays out, the angler would at once be apprised when a fish strikes and can then assume control over the rod and reel.

The foregoing description is illustrative of the invention, which, however, is comprehended by the scope of the subjoined claims.

Having described my invention, what I claim is:

1. A holder for a fishing rod and attached reel comprising an elongated base, side walls projecting upwardly from said base to provide an open channel, a slot extending from one end of one of said side walls to a point intermediate the length thereof, the width of said channel being proportioned to receive a reel with the attached rod in alignment with said channel and said slot being proportioned and arranged to receive and hold the handle of the reel against rotation.

2. A holder for a fishing rod and attached reel comprising an elongated hollow base, side walls projecting upwardly from said hollow base to provide an open channel, a slot extending from one end of one of said side walls to a point intermediate the length thereof, the width of said channel being proportioned to receive a reel with the attached rod in alignment with said channel, said slot being proportioned and arranged to receive and hold the handle of the reel against rotation and a weight positioned in said hollow base to prevent undesired displacement of said holder when in use.

LEO A. BRAATZ.

No references cited.